Figure 1:
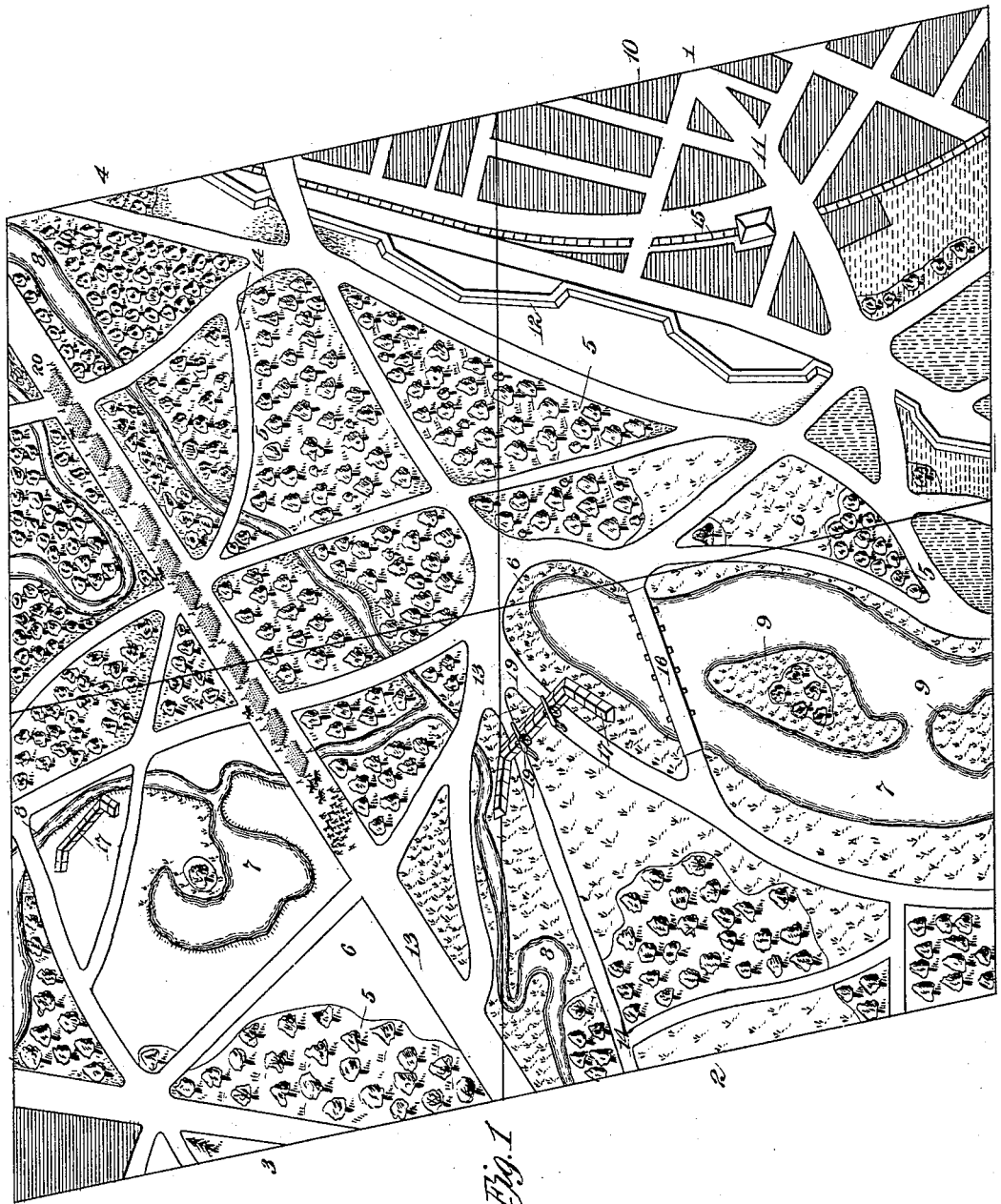

No. 742,870. PATENTED NOV. 3, 1903.
B. B. HILL.
APPARATUS FOR THE DEMONSTRATION AND STUDY OF MILITARY OR NAVAL PROBLEMS.
APPLICATION FILED MAY 14, 1901. RENEWED AUG. 5, 1903.
NO MODEL. 2 SHEETS—SHEET 1.

Witnesses:
Jas. F. Coleman
Archibald G. Reese

Inventor
Barton B. Hill
by Dyer Edmonds Dyer
Att'ys.

No. 742,870. PATENTED NOV. 3, 1903.
B. B. HILL.
APPARATUS FOR THE DEMONSTRATION AND STUDY OF MILITARY OR NAVAL PROBLEMS.
APPLICATION FILED MAY 14, 1901. RENEWED AUG. 5, 1903.
NO MODEL. 2 SHEETS—SHEET 2.
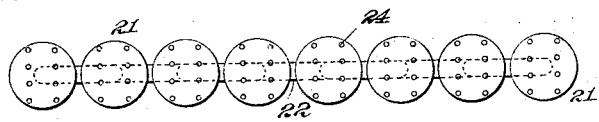
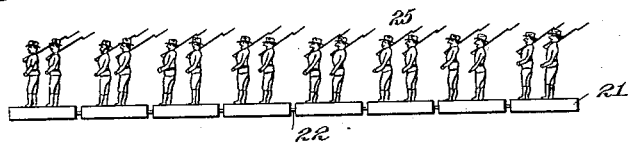
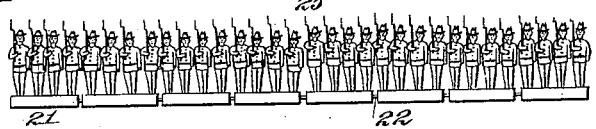
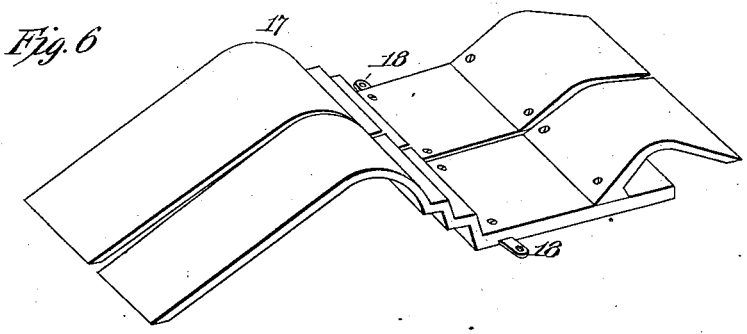
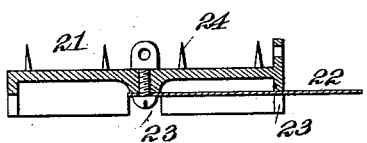
Witnesses:
Jas. F. Coleman
Archibald G. Reese
Inventor
Barton B. Hill
by Pyper Edmonds & Pyper
Att'ys.

No. 742,870. Patented November 3, 1903.

UNITED STATES PATENT OFFICE.

BARTON B. HILL, OF ST. PETERSBURG, RUSSIA.

APPARATUS FOR THE DEMONSTRATION AND STUDY OF MILITARY OR NAVAL PROBLEMS.

SPECIFICATION forming part of Letters Patent No. 742,870, dated November 3, 1903.

Application filed May 14, 1901. Renewed August 5, 1903. Serial No. 168,364. (No model.)

*To all whom it may concern:*

Be it known that I, BARTON B. HILL, a citizen of the United States, residing at St. Petersburg, in the Empire of Russia, have invented a certain new and useful Improvement in Apparatus for the Demonstration and Study of Military or Naval Problems, of which the following is a specification.

This invention relates to improvements in apparatus for use in facilitating the study of strategical and other military and naval tactics, movements, and problems by graphic representation of armies and fleets upon a surface specially prepared to represent topographically the country or positions in which such movements are to be carried on, whereby a proportionate representation can be obtained indicating correctly the field of operation, together with the forces to be maneuvered thereon, the whole being carried out in the presence of a number of military students, officers, or others occupying suitable positions for observing and inspecting the same within a building or other inclosure or on a parade-ground or other specially-prepared exterior space. I denominate my invention the "guerreograph."

In carrying my invention into effect I employ a plane surface or screen constructed in any suitable way, but composed, preferably, of a series of sections of regular symmetrical formation, which sections are made, preferably, of an area indicative of any determined unit of measurement. For example, each section may be a rectangle of twenty feet square, representative of a square mile of actual topography. These sections are fitted and secured together in any suitable way and receive on their surface paper, canvas, or other material for displaying topographically any map or representation of an actual district which may be selected as the field of operation. Instead of making the screen or surface of sections, as explained, it may be made continuous of wood, either plain or covered with enamel or linoleum, or it may be made of concrete or asphalt or any other suitable material for the purpose. I transfer a representation of a topographical map onto the surface of the screen by means of a projecting-lantern, which throws thereon a representation from a lantern-slide, which representation when on the screen serves as a guide or temporary map, which may be traced upon the screen-surface and painted over or otherwise made permanent as a representation of the projected scene. I preferably employ a number of rolls of paper or other suitable material on which is printed or painted in color the usual groundwork for indicating the nature or topography of any particular district, so that such rolls can be cut out and readily pasted or secured to the screen over the projected representation of the surface indicated on the screen as being the nature of the area or ground thus covered. Instead of attaching an independent surface to the screen area I may indicate the district topographically by hand-brushes and coloring, thus producing a facsimile map of that projected from the lantern. When the screen-surface is made of sections, the sections may be produced separately and subsequently fitted and joined together upon a platform or other displaying area of the building in which the representation is to take place, but when made continuous throughout the area may be divided into sections which may be successively produced by projecting thereon the representation from a topographical map, as explained. The map which is thus secured is preferably of enormous size and may in practice be a thousand feet or more in length, so that it may be traversed by the living persons engaged in the participation of the maneuvers as well as by those who may be called upon to study or inspect the same. In connection with the enormous map thus secured I employ miniature figures of troops and equipments, together with miniature representations to scale of trenches and various sections of forts, redoubts, fortifications, and other earthworks as models, colored to indicate the ground and other surfaces of the construction which is to be represented. I employ also in connection with the representation actual figures or models of the various armies and armaments of the service, the whole typical formation of men and equipments being such as would be necessary to be used in actual warfare or actual maneuvers, arranging and directing such movements over the surface of the map, so as to accurately portray the positions occupied during such movements and the time in which they will be effected. The movements and maneuvers are controlled by commands and instructions given to officers in charge of various companies or divisions, the whole being effected upon a surface which can be watched from a distance by those who are being instructed therein. In this way students of military tactics can become as familiar with the scheme to be carried out and the methods for manipulating and effecting such movements as if actually participating in the real maneuvers.

In order that the invention may be better understood, attention is directed to the accompanying drawings, forming a part of this specification, and in which—

Figure 1 represents graphically a map composed of four sections, each representative of one-fourth of a square mile of actual area, showing figures as they appear thereon, the effect secured being that of a bird's-eye view of an actual maneuver, the view being taken at an angle of approximately forty-five degrees from the surface; Fig. 2, a plan view of the blocks for carrying the miniature figures representative of a company of infantry; Fig. 3, a front elevation of the same, representing the figures in double-rank formation; Fig. 4, a corresponding view representing the figures in company-front formation; Fig. 5, an enlarged sectional view of one of the blocks carrying the figures, and Fig. 6 a perspective view of two sections of miniature intrenchments.

In all of the above views corresponding parts are represented by the same numerals of reference.

In Fig. 1 the topographical map represents four sections 1, 2, 3, and 4, which it is assumed are indicative of one square mile of actual territory representing the scene of operations. On this map the several necessary topographical features are indicated. For example, we show certain portions 5 indicating woodland, portions 6 indicating marshy or cleared ground, bodies of water 7 7, a rivulet and its branches 8, islands 9 9 in one of the lakes 7, a town 10 with its streets 11 and fortifications 12, country roads 13, foot-paths 14, and finally a railroad 15. In making the map on the large scale indicated a small topographical map is first secured, which is divided off into corresponding sections of proportionately smaller size, and on this topographical map or master the topographical features of the country are indicated in the ordinary conventional way. The section of the topographical map corresponding, for example, to the section 1 of the map to be reproduced is first photographed to form a lantern-slide, and a projecting-camera being elevated sufficiently above the surface a projection thereof is effected on the section 1. This projected representation is made permanent in any suitable way—as, for example, by painting on the surface a graphic representation of the desired topography. Preferably, however, I employ long rolls of paper or other material, which carry the desired topographical indications. For example, one of the rolls may be formed of paper, having trees printed or painted thereon and representing woodland, another may carry the representation of the marshy or cleared ground, &c. From these rolls of paper the material is cut out in the desired forms and pasted or otherwise secured on the prepared surface to form the complete map. When the first section has been thus finished, the second section may be completed, and so on. In this way an enormously large map can be effectively and economically produced which will be correctly representative of a desired locality and which, particularly when viewed from above, presents to the eye a close simulation of the natural conditions. It will, however, be understood that the large map can be copied from the small topographical master in other ways than by photography and a projecting-lantern, as explained. Having thus secured a topographical map, strategical or other military maneuvers are performed thereon with miniature representations of men and materials. For example, in Fig. 1 a miniature pontoon-bridge 16 is thrown across one of the lakes 7. Redoubts 17 are also shown, placed in such localities as may be desired by those performing the maneuvers. The redoubts 17 are made in sections, as shown in Fig. 6, which may be secured together by lugs 18, so that fortifications of different sizes and forms may be prepared. It will of course be understood that my invention contemplates the utilization of miniature representations of all the forms of fortifications utilized in actual warfare or maneuvers—as, for example, hasty intrenchments, different parallels, trenches, saps, bomb-proofs, gun-batteries, &c. Within some of the redoubts I show field-pieces 19, which are also miniature models constructed to proper scale. In its preferred embodiment the invention contemplates the employment of all the paraphernalia of warfare, such as mortars, siege-guns, armored turrets, balloon-wagons, railway equipment, palisades, stockades, &c. I also show in Fig. 1 the representation of a regiment 20, the soldiers comprising the companies of which are preferably mounted on connected blocks 21, as shown in Figs. 2 to 5, inclusive. These blocks, which are disklike in form, are connected by elastic metallic links 22, which may engage with recesses 23 23, formed in the depending rim of each block, as shown in Fig. 5. The blocks are provided with pins 24 for sustaining the figures 25. In this way all the figures representing a single company may be moved simultaneously. By disposing the blocks in the form shown in Fig. 2 a representation will be secured of a company marching in column of fours, while by turning the blocks to the position shown in Fig. 4 a representation of company front will be obtained. In either position of the blocks they will be locked by the engagement of the links 22 with one of the recesses 23, as will be understood.

Figures representing cavalry, artillery, mounted batteries, hospital corps, &c., will be similarly mounted on blocks, so as to be readily movable from place to place. These figures, with the miniature paraphernalia of actual warfare, are maneuvered on the surface of the map by the participating officers, the movements being timed to correspond with those in actual practice. In this way the desired military or naval problems can be solved with the same certainty as would be possible in actual warfare.

Having now described my invention, what I claim as new therein, and desire to secure by Letters Patent, is as follows:

1. Apparatus for the demonstration and study of military and naval problems, comprising a topographical map of such great size that the contestants may freely traverse the same, a series of disks pivotally connected by links and movable upon said map, and figures carried by said disks and corresponding in size to the scale of the map, substantially as set forth.

2. Apparatus for the demonstration and study of military and naval problems, comprising a topographical map of such great size that the contestants may freely traverse the same, a series of disks pivotally connected by links and movable upon said map, figures carried by said disks and corresponding in size to the scale of the map, and means for locking the disks in different positions relatively to each other, substantially as set forth.

3. Apparatus for the demonstration and study of military and naval problems, comprising a topographical map of such great size that the contestants may freely traverse the same, a series of rimmed disks movable upon said map, links connecting said disks and engaging slots in the rims thereof, and figures carried by said disks, substantially as set forth.

This specification signed and witnessed this 9th day of May, 1901.

BARTON B. HILL.

Witnesses:
JNO. R. TAYLOR,
ARCHIBALD GRAY REESE.